United States Patent [19]

Hougen

[11] 4,047,827

[45] Sept. 13, 1977

[54] ACCESSORY SUPPORT PLATES FOR A MAGNET BASE DRILL

[76] Inventor: Everett D. Hougen, G-5072 Corunna Road, Flint, Mich. 48504

[21] Appl. No.: 745,393

[22] Filed: Nov. 26, 1976

[51] Int. Cl.[2] .......... B23B 39/00

[52] U.S. Cl. .......... 408/76; 90/DIG. 23

[58] Field of Search .......... 408/76, 241, DIG. 712, 408/72, 103, 105, 108; 90/DIG. 23

[56] References Cited

U.S. PATENT DOCUMENTS

| | | | |
|---|---|---|---|
| 3,791,755 | 2/1974 | Warren | 408/76 |

FOREIGN PATENT DOCUMENTS

| | | | |
|---|---|---|---|
| 896,945 | 5/1944 | France | 408/76 |
| 1,260,818 | 4/1961 | France | 408/76 |

*Primary Examiner*—Harrison L. Hinson
*Attorney, Agent, or Firm*—Barnes, Kisselle, Raisch & Choate

[57] ABSTRACT

A magnet base drill having a pair of plates formed of magnetic material removably mounted on either the side walls or the bottom face of the electromagnet forming the base of the drill and adjustable thereon to contact portions of a convex support surface spaced laterally outwardly from the central lonitudinal axis of the electromagnet when the latter is positioned on the support surface.

12 Claims, 9 Drawing Figures

ACCESSORY SUPPORT PLATES FOR A MAGNET BASE DRILL

This invention relates to a magnet base drill and, more specifically, to accessory means for such drills to enable the firm attachment thereof to convexly shaped support surfaces.

Drills having a base in the form of an electromagnet for supporting the magnet on a magnetic support surface have been used for many years. When the magnetic support surface is flat, such as the face or web of a structural beam, little difficulty is encountered in retaining the magnet in a fixed, stable position on the support. However, such drills have not been used with any degree of success on magnetic surfaces which are convex in shape, such as pipes and cylindrical tanks. On a convex surface it is difficult to retain the magnet in a stable position because of the inability to obtain sufficient area of contact between the electromagnet and the convex support surface and also because of the fact that the support surface is in itself curved while the bottom face of the electromagnet is flat.

The object of the present invention is to provide an accessory for such magnet base drills which enables the drills to be easily and firmly supported on a convex surface, such as an iron pipe.

More specifically, the present invention contemplates a pair of plates formed of a magnetic material which are adapted to be mounted on either the side walls or the bottom wall of the electromagnet and so adjusted as to contact portions of the convex surface spaced laterally outwardly from the central portion thereof and thus provide sufficient additional contact surfaces for enabling the drill to be firmly supported magnetically on the support.

Other objects, features and advantages of the present invention will become apparent from the following description and accompanying drawings, in which.

Figure 1:
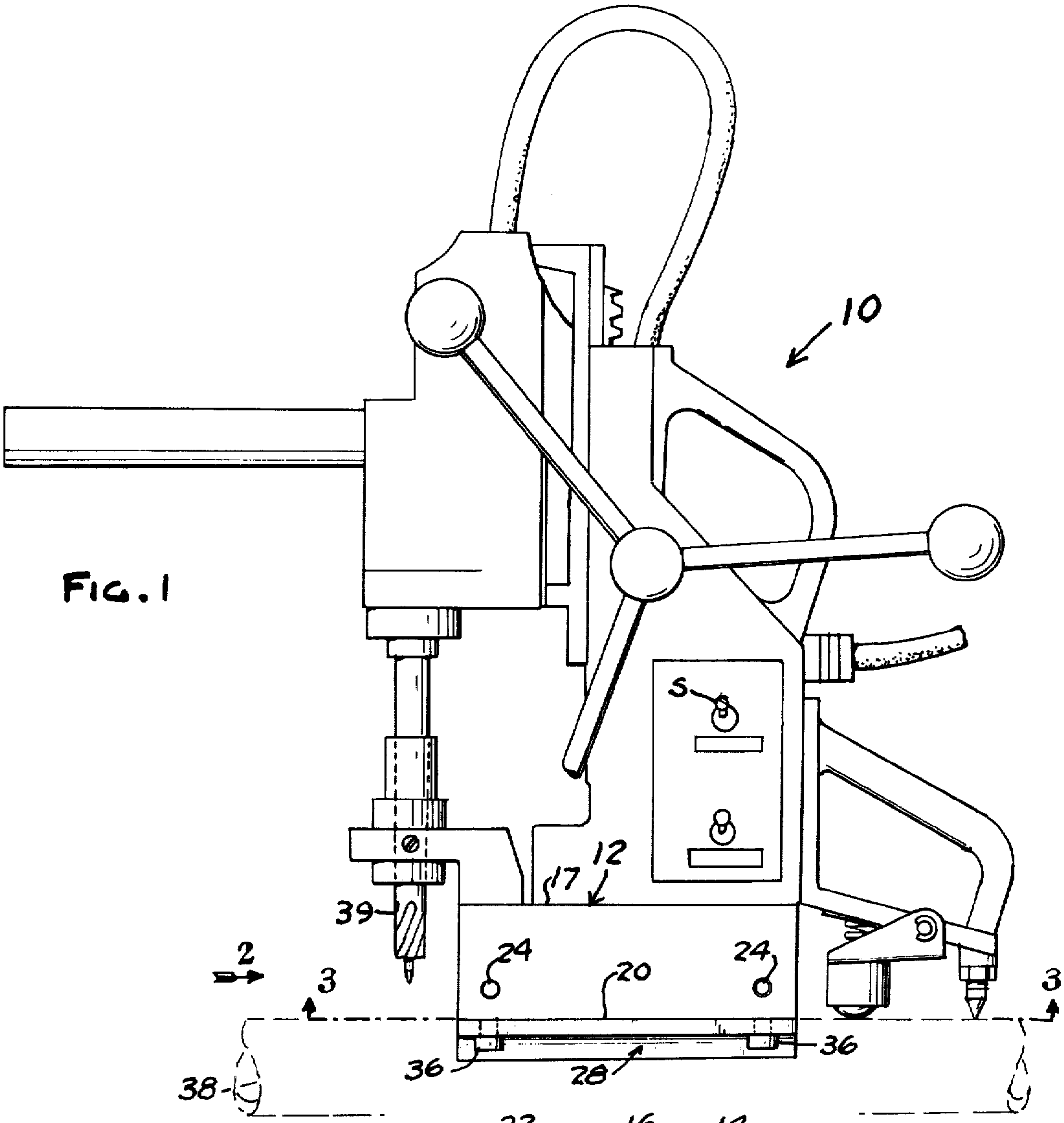
FIG. 1 is a side elevational view of a magnet base drill having the accessory plates of the present invention mounted on the bottom face thereof.
Figure 3:
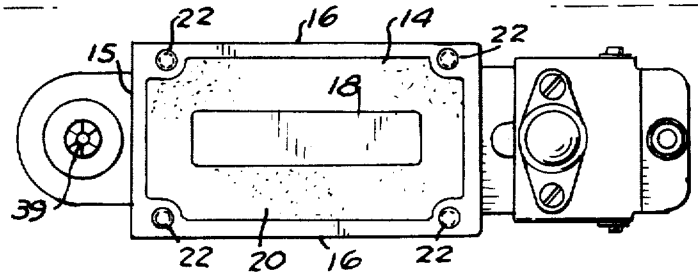
FIG. 3 is a bottom plan view of the drill along line 3—3 in FIG. 1 with the accessory plates removed.

In FIG. 1 numeral 10 designates a magnet base drill substantially identical with that shown in my U.S. Pat. No. 3,969,036, dated July 13, 1976. The base of the drill comprises an electromagnet 12 of rectangular shape which is adapted to be energized and de-energized by a switch S. Electromagnet 12 comprises a housing 14 formed as a ferrous casting having front and rear end walls 15, flat side walls 16, a top wall 17 and an open bottom. Within the housing 14 there is arranged an iron core 18 around which is wound a coil (not illustrated). Core 18 is connected to or formed integrally with top wall 17 and is spaced out of contact with walls 15,16. Electromagnet 12 has a substantially flat bottom wall 20 defined by the lower edges of the housing and the lower end face of the core 18. The space therebetween is filled with an insulating material, such as a resin. The two poles of the magnet are defined by the walls of the housing and core 18. When the lower edges of side walls 16 and the lower end face of core 18 are bridged by a body of magnetic material and the electromagnet is energized, the body of magnetic material forms a continuous magnetic flux path between the housing 14 of the electromagnet and core 18. The electromagnet base thus far described is of conventional construction.

In accordance with the present invention the bottom face of the electromagnet is provided with four threaded openings 22 at the four corners thereof and each of the two side walls 16 is also provided with a pair of threaded openings 24 spaced upwardly from the bottom wall 20 of the electromagnet. The threaded openings 22,24 are utilized for attaching to the electromagnet a pair of accessory plates 28. Accessory plates 28 are formed of a ferrous material, such as steel, and are preferably of L-shape, having a long leg 30 terminating in a short foot 32 extending perpendicular to leg 30. In addition, each plate 28 is provided with a pair of elongated slots 34, the spacing of which corresponds to the spacing between openings 22,24. Plates 28 have a length generally corresponding to the length of housing 14 and are adapted to be secured to the side walls 16 or the bottom wall 20 of the electromagnet by means of screws 36.

Figure 2:
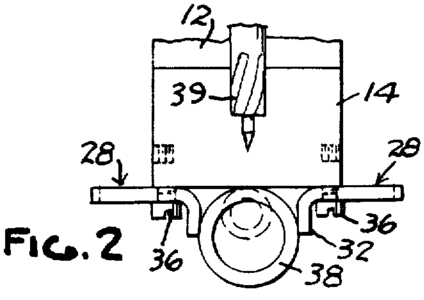
FIG. 2 is a fragmentary end view of the drill shown in FIG. 1.
Figure 4:
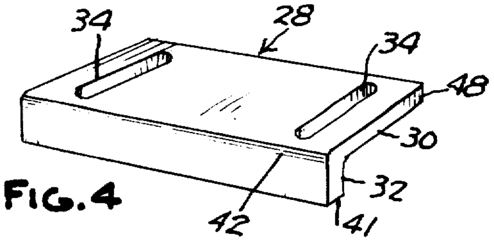
FIG. 4 is a perspective view of one of the accessory plates according to the present invention.

If it is desired to support drill 10 on a pipe, for example, which has a diameter substantially smaller than the width of the electromagnet, plates 28 can be mounted on the bottom face of the electromagnet in the manner illustrated in FIGS. 1 and 2. Screws 36 extend through slots 34 and into threaded opening 22. Before the screws are tightened the electromagnet is centered longitudinally on the pipe 38. Thereafter the two plates 28 are shifted inwardly until the feet 32 thereof contact the outer surface of the pipe. Screws 36 then are tightened. When switch S is thereafter actuated to energize the electromagnet, plates 28 cooperate with the pipe to form a continuous magnetic flux path between core 18 and the housing 14. The drill thus firmly adheres to the pipe in a stable upright position so that the rotating drill bit 39 can be driven downwardly to cut a hole in the pipe at a location forwardly of base 12.

Figure 5:
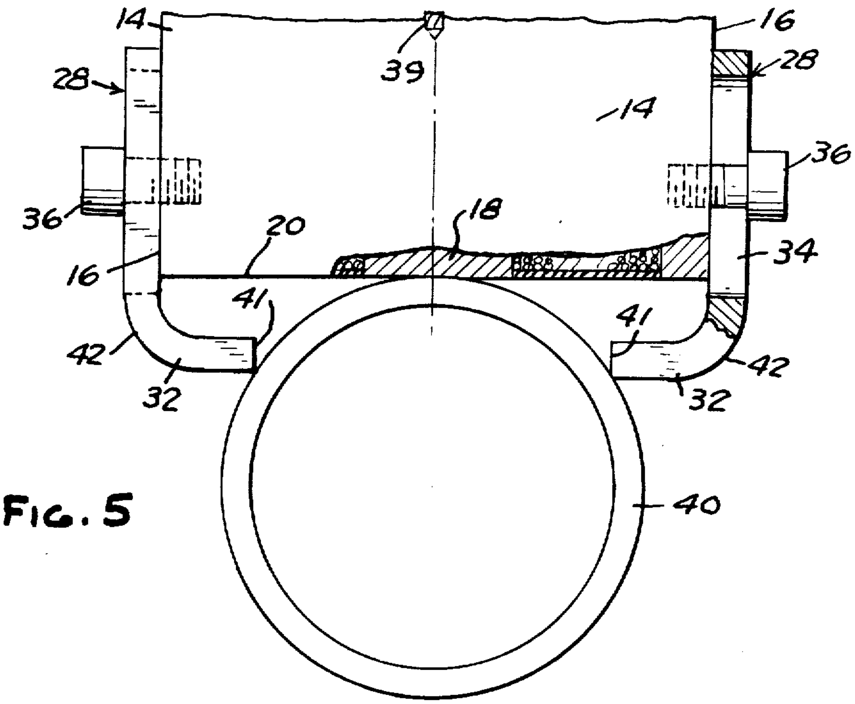
FIGS. 5 through 9 show various arrangements of the accessory plates on the base of the drill for accommodating the electromagnet to workpieces of different sizes.

If the pipe on which the drill is to be supported has a diameter only slightly smaller than the width of housing 14, then plates 28 can be mounted on the side walls 16 of housing 14 in the manner illustrated in FIG. 5. More specifically, in FIG. 5 plates 28 are mounted on side walls 16 with feet 32 of the plates projecting inwardly toward each other. The plates are adjusted vertically and clamped in place by screws 36 so that the inner opposed ends 41 of feet 32 contact the periphery of pipe 40 above the center thereof when the bottom face 22 of housing 14 is resting on the upper surface of the pipe.

Figure 6:
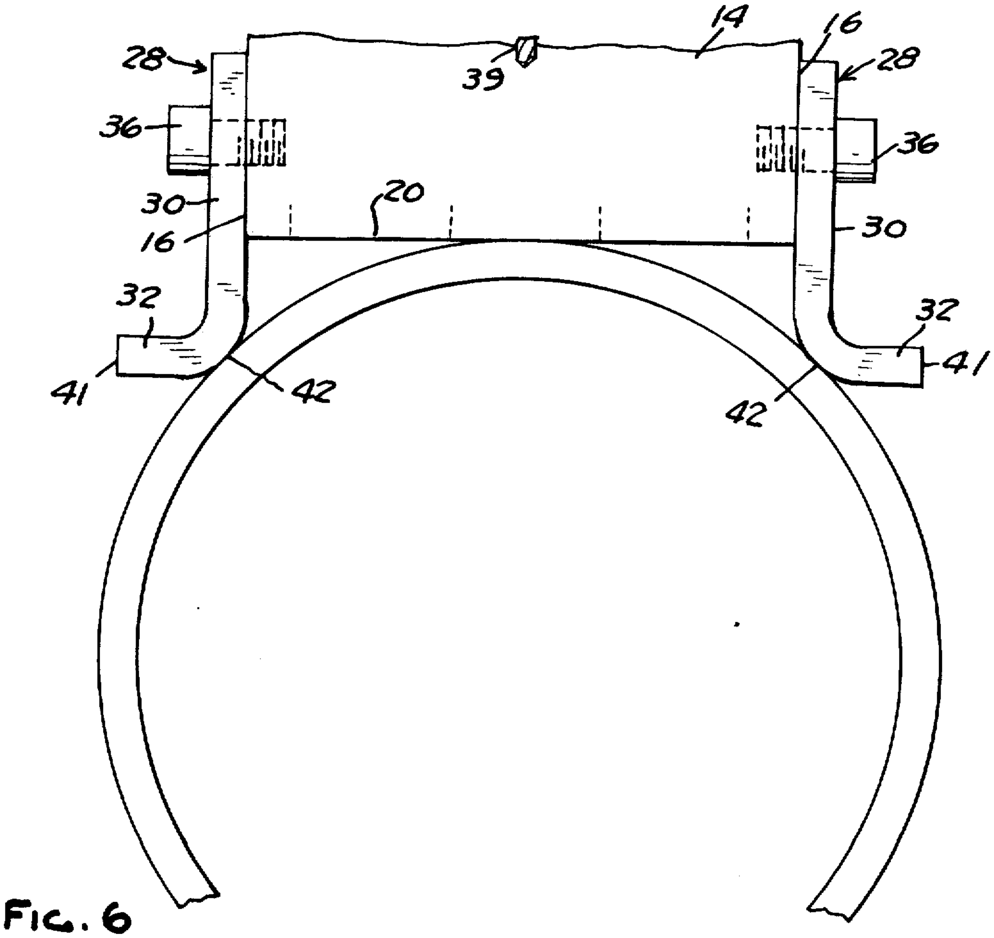
Figure 7:
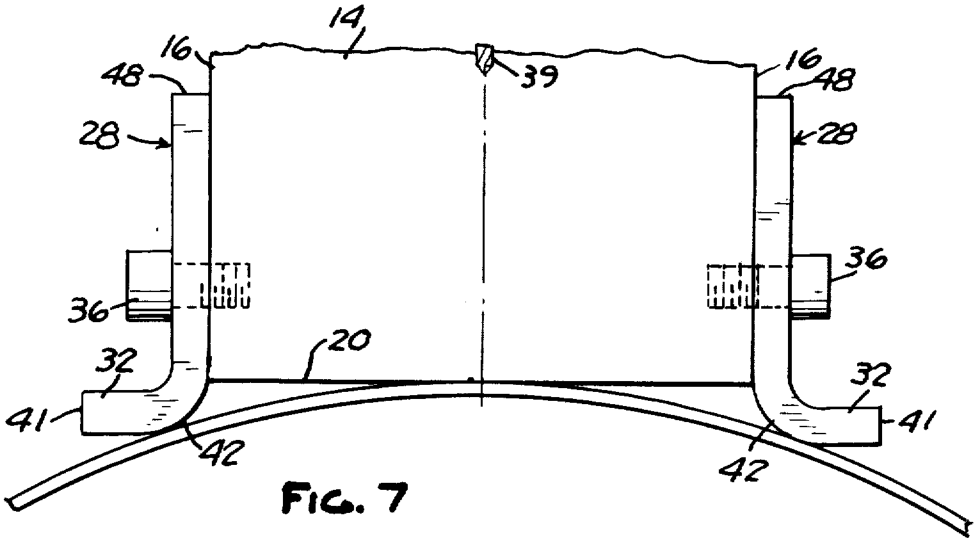

FIGS. 6 and 7 show the drill mounted on convex surfaces of progressively greater diameters. In the arrangements shown in these figures the feet 32 of plates 28 project outwardly and the rounded corner portions 42 of the plates contact the convex support surface. In FIG. 6 the support comprises a large diameter pipe 44 and in FIG. 7 the support comprises an even larger diameter convex surface 46. In each instance plates 28 are adjusted vertically on the side walls of housing 14 so that, when the bottom face 20 of the electromagnet is positioned on the top of the support, the corner portions 42 of plates 28 engage the convex support surface at portions thereof spaced laterally outwardly from the central longitudinal axis of the electromagnet.

Figure 8:
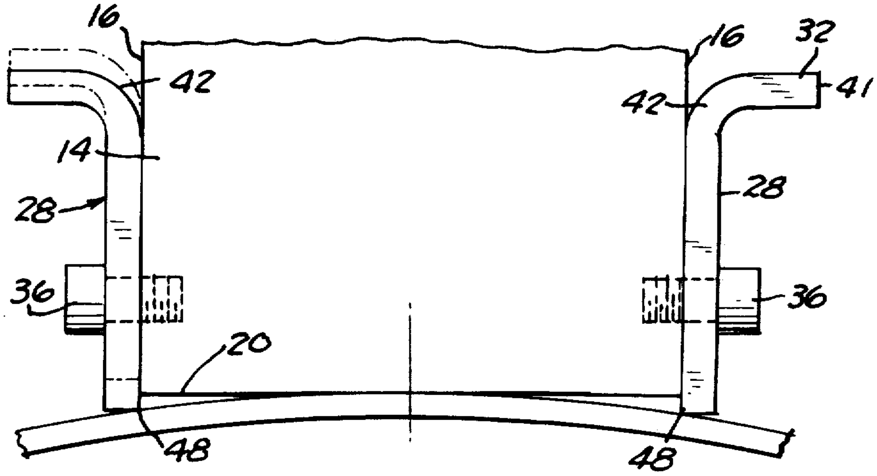

In the event the support surface has an unusually large diameter, such as the side wall of a large cylindrical tank, the accessory plates 28 can be arranged on the side walls 16 of housing 14 in the manner illustrated in FIG. 8. In this arrangement plates 28 are secured to the side walls of the housing with the feet 32 at the upper ends thereof so that the lower straight ends 48 of the plates engage the support surface 50. The broken line showing in FIG. 8 illustrates the fact that it is not necessary to remove the plates 28 from housing 14 when the drill is used on a flat support surface. In this case it is merely necessary to loosen screws 36, shift the plates vertically to the position indicated at 28' and then tighten screws 36. In this position the lower straight edges 48 of plates 28 are disposed above the bottom face 20 of the housing.

Figure 9:
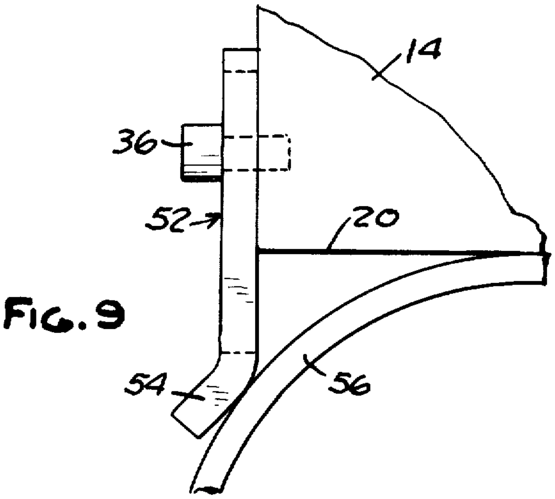

FIG. 9 shows a modified form of accessory plate. Accessory plate 52 is similar in all respects to accessory plate 28, except that the foot portion 54 thereof is inclined to the vertical leg of the plate at an acute angle rather that at a right angle. Under some circumstances the location of foot 54 at an acute angle such as shown in FIG. 9 will present a larger area of surface contact between the accessory plate and the convex support surface 56.

It will be appreciated that where plates 28 are arranged on housing 14 so that they contact the convex support surface along lines disposed above the center of curvature of the convex surface the drill is vertically supported along three laterally spaced locations. This tends to provide a very stable positioning of the drill on the convex surface. As shown in FIG. 5, this type of support is obtainable even when the diameter of the pipe is less than the width of the electromagnet base. This form of support is also obtainable when the pipe diameter is as small as shown in FIG. 2 by simply mounting plates 28 on the bottom face of the base so that the straight edges 48 engage the surface of the pipe instead of the feet 32. This is possible because slots 34 extend substantially the full width of legs 30 and the width of each leg 30 is equal to at least half the width of housing 14.

I claim:

1. In combination, a portable drill unit having an electromagnetic base for magnetically adhering the drill to a magnetic support, said base having a bottom wall and a pair of opposite side walls, a pair of plates formed of magnetic material, means for mounting said plates on the side walls of said base for vertical adjustment thereon, said plates having lower edge portions and being adjustable on said base so that said lower edge portions project downwardly below said bottom wall of said base, and means for rendering at least the central portion of said bottom wall and said plates magnetic when the electromagnet is energized, whereby, when said base is mounted on a convex magnetic support surface, said plates can be extended downwardly to a position wherein the lower edge portions thereof engage portions of said support surface at locations spaced laterally outwardly on opposite sides from the central portion of said base to thereby magnetically adhere the drill on said support in a stable position when the electromagnet is energized.

2. The combination set forth in claim 1 including means for mounting said plates on said bottom wall for lateral adjustment towards and away from each other in a plane parallel to said bottom wall.

3. The combination set forth in claim 1 wherein said plates are generally L-shaped.

4. The combination set forth in claim 1 wherein said plates have a length generally corresponding to the length of said base.

5. The combination set forth in claim 4 wherein the plates have a width equal to at least one-half the width of said base.

6. The combination set forth in claim 5 wherein each plate has a pair of parallel slots therein extending substantially the full width thereof.

7. The combination set forth in claim 1 wherein the means for adjustably mounting said plates on said base comprise a pair of vertically elongated slots on each plate and a screw extending through each slot and threaded into said base.

8. The combination set forth in claim 1 wherein the side walls of said base are formed of a magnetic material and form part of the magnetic circuit of said electromagnet.

9. The combination set forth in claim 8 wherein said plates contact the side walls of said base to form part of said magnetic circuit.

10. The combination set forth in claim 1 wherein each plate in vertical section comprises a vertical leg having a short foot at one end thereof angularly inclined to said vertical leg.

11. The combination set forth in claim 9 wherein said foot is disposed perpendicular to said vertical leg.

12. The combination set forth in claim 8 wherein said foot is inclined to said vertical leg at an acute angle.

* * * * *